United States Patent [19]
Matt et al.

[11] Patent Number: 5,909,489
[45] Date of Patent: Jun. 1, 1999

[54] METHOD OF AND CIRCUIT ARRANGEMENT FOR IMPROVING THE TRANSMISSION PROPERTIES OF AN ECHO AFFECTED TRANSMISSION LINK IN A TELECOMMUNICATIONS NETWORK

[75] Inventors: Hans Jürgen Matt, Remseck; Michael Walker, Baltmannsweiler, both of Germany

[73] Assignee: Alcatel Alsthom Compagnie Generale d'Electricite, Paris, France

[21] Appl. No.: 08/828,191

[22] Filed: Mar. 21, 1997

[30] Foreign Application Priority Data

Mar. 23, 1996 [DE] Germany .............. 196 11 548

[51] Int. Cl.$^6$ ................... H04M 9/08
[52] U.S. Cl. ............ 379/406; 379/410; 379/411; 379/391; 370/286; 370/289
[58] Field of Search ............. 379/391, 406, 379/410, 411; 370/286, 289

[56] References Cited

U.S. PATENT DOCUMENTS

| | | | |
|---|---|---|---|
| 4,891,837 | 1/1990 | Walker et al. | 379/390 |
| 4,979,163 | 12/1990 | Erving et al. | 370/32.1 |
| 5,467,394 | 11/1995 | Walker et al. | 379/392 |
| 5,570,423 | 10/1996 | Walker et al. | 379/410 |

FOREIGN PATENT DOCUMENTS

| | | |
|---|---|---|
| 0592787 | 4/1994 | European Pat. Off. . |
| 0600164 | 6/1994 | European Pat. Off. . |
| 4313256 | 10/1994 | Germany . |

OTHER PUBLICATIONS

"Signal processing method for improving speech communication via hands–free facilities" R. Wehrmann et al., *The Telecommunications Engineer*, 40th year, Oct. 1994, pp. 27–28.

"Auch in der Ferne gut verstanden" D. Pfeil et al, telecom report 16 (1993) H.4, pp. 214–216.

"Combination of noise reduction and echo compensation during hands–free operation", *Communications Electronics*, Berlin 43 (1993), pp. 274–280.

*Primary Examiner*—N. Le
*Assistant Examiner*—Shih-Wen Hsieh
*Attorney, Agent, or Firm*—Ware, Fressola, Van Der Sluys & Adolphson LLP

[57] ABSTRACT

When telecommunications systems with analog and digital circuit technology are interconnected, the two-wire/four-wire transitions are achieved with hybrid circuits in which mismatches cannot be avoided. They result in signal reflections in the form of interfering echoes which can considerably reduce speech intelligibility. The known methods of echo compensation for hands-free facilities are not suitable for compensating line echoes, since the signal level and the delay times of lines can be very different. A compander (3.7) is used to suppress the effect of line echoes, whose transmission characteristic, in addition to being controlled by a coupling factor between the transmit path and the receive path, and by a control signal determined by the noise level, is also controlled in the invention with the speech level that is received from the distant subscriber. Furthermore, the amplification in the linear starting range of the compander characteristic is made dependent on the ratio or comparison between the speech level and the noise level on the transmit path. The invention can be used in conjunction with hands-free facilities in communications terminals, in addition it can be spatially assigned to the hybrid circuits, or it can find central applications in base stations of radio exchange systems or in switching centers.

10 Claims, 5 Drawing Sheets

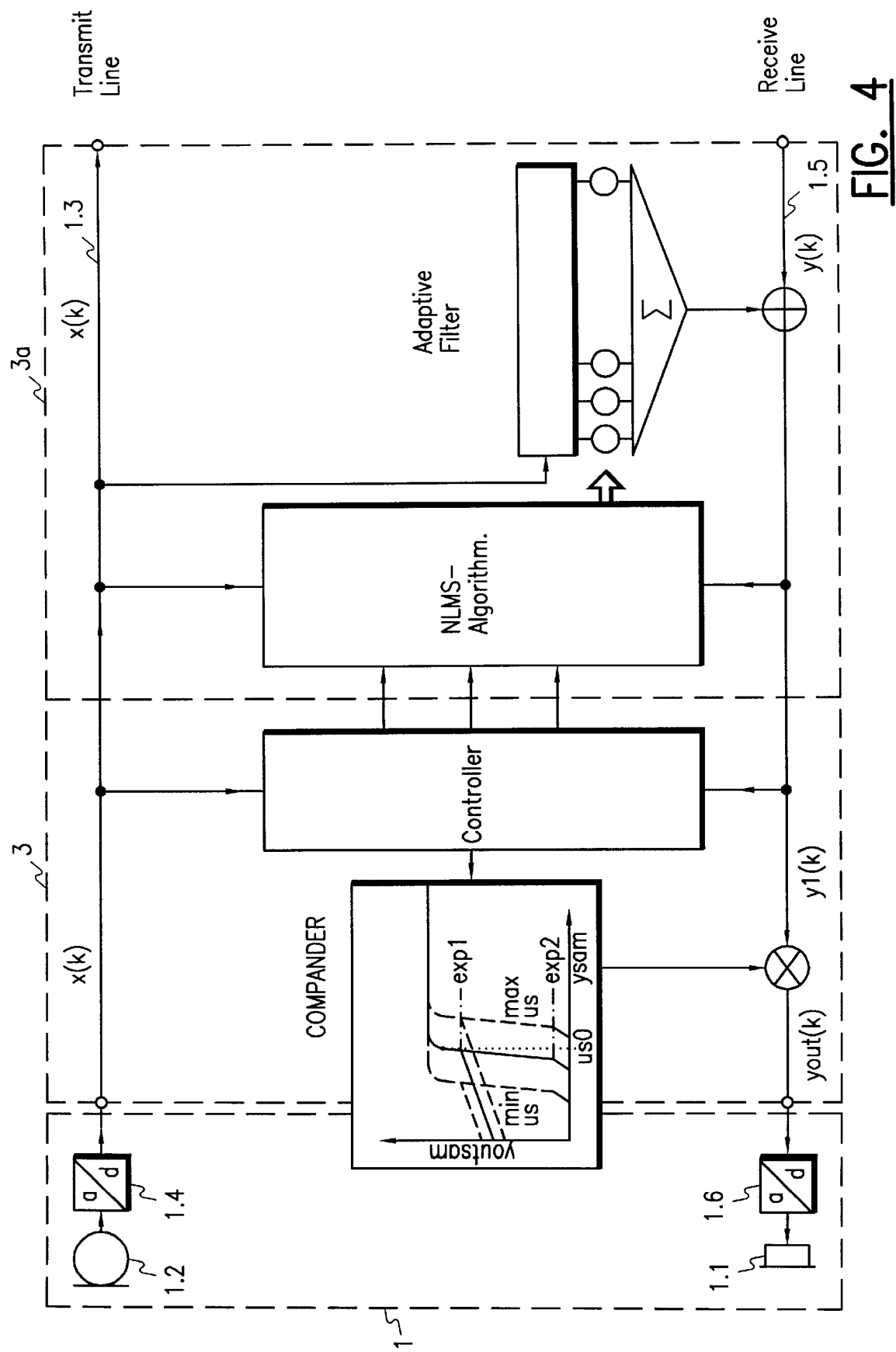

METHOD OF AND CIRCUIT ARRANGEMENT FOR IMPROVING THE TRANSMISSION PROPERTIES OF AN ECHO AFFECTED TRANSMISSION LINK IN A TELECOMMUNICATIONS NETWORK

BACKGROUND OF THE INVENTION

1. Field of the Invention

The invention concerns a method of and a circuit arrangement for improving the transmission properties of an echo-affected transmission link in a telecommunications network, which comprises for example interconnecting the analog and digital circuits of telecommunication systems. This interconnection creates problems with the transition of two-wire transmission lines, such as are typical for the subscriber connection lines in analog telecommunications networks, to four-wire transmission lines in digital telecommunications networks. These two-wire/four-wire transitions are provided for by a hybrid circuit, where mismatches in the balancing line with respect to the current line properties can never be fully avoided, creating signal reflections in the form of interfering echoes which can considerably reduce speech intelligibility between the subscribers, or which can significantly increase the error rate during data transmission.

2. Description of Related Art

It is basically known to eliminate the effect of echoes with echo compensators, see R. Wehrmann et. al: "Signal processing method for improving speech communication via hands-free facilities", *The Telecommunications Engineer*, 40th. year, October 1994, pages 27–28. This essay describes how the transmit function of the real system can be fairly accurately simulated with an echo compensator. The signal arriving at the subscriber then passes through both the real system as well as the one simulated by the echo compensator, and after that the output signal of the echo compensator is subtracted from the echo-affected signal of the real system, thus compensating for most of the echo. In a real system, for example loudspeaker-room-microphone, such an echo compensator can considerably reduce the so-called local echo which is created by the acoustic coupling between the loudspeaker and the microphone.

Mismatched hybrid circuits in telecommunications networks with two-wire/four-wire transitions create an electrical coupling between the transmit path 1.3 and the receive path 1.5, and a portion of the transmitted signal is reflected back to the subscriber on the receive path as a so-called line echo. Echoes of different intensities and duration, which can be roughly divided into near and distant echoes, are a function of the distance between the subscriber and the hybrid circuit along the transmit path, and different transmission means and transmission devices such as for example satellite links, submarine links, encoding devices or highly compressed audio-video-codecs. A line transmission system with a transmit path and a receive path therefore differs significantly from a loudspeaker-room-microphone, particularly with regard to different echo delay times and different line attenuations.

Adaptive digital filters are preferably used as echo compensators, whose filter coefficients can be determined and adjusted for example in accordance with the Normalized Least Mean Square Algorithm, briefly called NLMS algorithm, see T. Huhn, H.-J. Jentschel: "Combination of noise reduction and echo compensation during hands-free operation", *Communications Electronics*, Berlin 43 (1993), pages 274–280. The filter coefficients must be constantly updated in accordance with the changing echo signal. The required filter length is determined by the sampling frequency and the longest echo delay time. The delay time from distant echoes is very different and can be over 250 ms, so that either the number of filter coefficients to be calculated becomes very large, or a method to determine the individual echo delay times must be used, for example a correlation analysis which requires a large computation effort, see U.S. Pat. No. 5,467,394. From this patent it is known to perform a correlation measurement between the received echo signal and the transmitted signal to ascertain the precise instant for determining the echo delay times and the filter coefficients. However any practical application of this solution fails because its cost is too high.

It is known to use companders to reduce the effects of local echoes during hands-free operation, whereby transmit signals above a reference value are compressed to a uniform signal level, they are then amplified if they have the same reference value, and are attenuated if they are below the reference value. In this way a circuit arrangement for the dynamic control of a terminal is known from the specification U.S. Pat. No. 4,891,837, whereby a controllable compander adapts the degree of amplification of the signal voltages produced by a microphone to the reference value, for the purpose of hands-free operation. The result is that fluctuations in the microphone signal, which are created by moderate variations in the talking distance and the individual speech volume, are compressed to a more uniform loudness level at the reproduction end.

Furthermore a method of improving the transmission properties of an electro-acoustical facility is known, whereby the position of the compander characteristic transfer function is automatically controlled, see EPO Publication 0 600 164 A1 and its German parent having Application No. DE 42 29 912 A1. The method detects whether the transmitted signal is generated by speech or by noise. The magnitude of the control signal for shifting the position of the compander characteristic, which is produced with the speech and noise detection, achieves the result that the speech being transmitted is sent at a constant level, that the background noise level is lowered for the transmission, and that the volume of the received reproduction is increased with increasing ambient noise.

The use of the previously described compander arrangement to suppress local echoes in hands-free facilities is known. However this compander arrangement is not suitable for suppressing line echoes, because with lines it must be taken into consideration that the signal level in the lines of telecommunication networks, particularly in dialing lines, can vary from one connection to another in the range of greater than 20 dB, and that the signal delay times can vary for example within the range of 10 ms to 10 s as a function of the number of satellite links between the connection points, or the kind of signal processing systems, for example by compression.

BRIEF SUMMARY OF THE INVENTION

This results in the task of providing a method and a circuit arrangement whereby the effect of line echoes can be eliminated in telecommunications networks with different line attenuations and different echo delay times, and whereby the naturalness of the transmitted speech can be improved in the transmit direction and in the receive direction.

According to a first aspect of the present invention, a method for improving transmission properties of an echo-affected signal on a transmission link comprises the steps of sensing a transmit path and a receive path of a transmission link for providing an electrical coupling factor signal having a magnitude indicative of an estimate of electrical coupling of a near echo between the transmit path and the receive path; providing, in response to said sensing of the receive path, a noise signal having a magnitude indicative of a noise level on said receive path; providing, in response to said sensing of the receive path, a speech signal having a magnitude indicative of a speech level of a distant subscriber; providing, in response to said electrical coupling factor signal, said noise signal, and said speech signal, a compander characteristic position control signal for controlling a position of a characteristic transfer function of a compander having a characteristic shape comprising an area of smaller and more constant amplification, an expansion area for stronger amplification and a compression area joined to the expansion area by a transition area; providing, in response to said compander characteristic position control signal and to said sensing of the receive path, an amplification factor signal; and providing, in response to said amplification factor signal and to said echo-affected signal on the receive path of the transmission link, an output signal for reception by a local terminal of a local subscriber.

In further accord with this first aspect of the present invention, the method further comprises the steps of providing, in response to the sensing of the transmit path, a local subscriber speech activity signal having a magnitude indicative of whether the local subscriber is speaking or not; and providing, in response to the local subscriber speech activity signal, a swing control signal for controlling the shape of the characteristic transfer function of the compander to have a smaller expansion when the local subscriber is speaking.

Otherwise stated, this first aspect of the present invention is a method of improving the transmission properties of an echo-affected transmission link in a telecommunications network with a compander which is inserted in the receive path of the transmission link to suppress a line echo and which is inserted in the transmit path of the transmission link to suppress a local echo in a hands-free facility, the position of the transfer characteristic of the compander in the case of the local echo being controlled in accordance with the acoustic coupling between a loudspeaker and a microphone and with the magnitude of the noise in the room surrounding the microphone and the loudspeaker, characterized in that in order to suppress the line echo, the position of the transfer characteristic of the compander is controlled in accordance with an electrical coupling between the transmit path and the receive path, the magnitude of the noise voltage on the receive path, and the speech level of the distant subscriber on the receive path, and/or that the shape of the transfer characteristic of the compander is controlled in accordance with the ratio between the speech level of the local subscriber and the noise level at the local subscriber on the transmit path.

According to a second aspect of the present invention, a circuit arrangement for carrying out the method of the present invention is characterized in that the compander has a control circuit associated therewith whose output is also the output of a maximum decision circuit having a first input connected to a coupling estimator, a second input connected to a third integrator, and a third input connected to a fifth integrator, that the coupling estimator is connected to the transmit path via a first integrator and to the receive path via a second integrator that the third integrator is connected to both the coupling estimator and the second integrator, and that the fifth integrator is connected to the receive path.

The nature of the invention includes eliminating the effect of line echoes with the aid of a compander with an entirely new controller, irrespective of the magnitude of the delay time and the volume conditions of the transmitted speech signal, even under unfavorable transmitting conditions, whereby a) the reference value of the compander characteristic during hands-free operation is controlled differently than with the already known controllers as a function of the estimated line level of the distant speaker, b) a differentiation is made between the level of the received echoes and the level received from the distant speaker and his background noise, and c) different types of compander characteristics with a different shape or swing are used to improve the naturalness of the speech transmission.

The method can be carried out at lower cost since neither digital filters with a large number of filter coefficients nor expensive correlation measurements are required.

These and other objects, features and advantages of the present invention will become more apparent in light of the detailed description of a best mode embodiment thereof, as illustrated in the accompanying drawing.

BRIEF DESCRIPTION OF THE DRAWINGS

The invention is explained in the following by means of a configuration example. The pertinent drawings are:

FIG. 4 a block diagram of the interconnection of the circuit diagram of the invention with an adaptive filter.

DETAILED DESCRIPTION OF THE INVENTION

Figure 1:
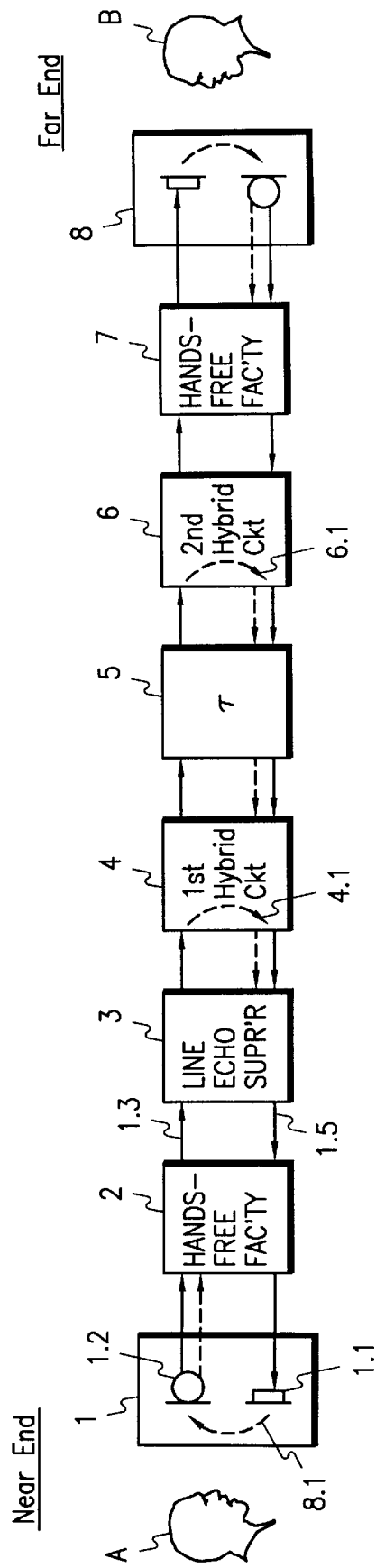
FIG. 1 a block diagram of a transmit path between a local subscriber and a distant subscriber.

To explain the facts of the situation, FIG. 1 illustrates a typical transmit path between a local subscriber A and a distant subscriber B. A terminal 1 and if required a hands-free facility 2, a line echo suppressor 3 and a first hybrid circuit 4 are located on the near-end side of local subscriber A. The different delay times of the signals through the network are symbolized by block 5. A second hybrid circuit 6 and if required a hands-free facility 7 for the terminal 8 of the distant subscriber B are located at the far end of the transmit path.

The hands-free facility 2 of the local subscriber A contains an echo compensator, including for example an adaptive echo filter and a hands-free compander to suppress the local echoes 8.1 which are created by the acoustical coupling between the loudspeaker 1.1 and microphone 1.2 when messages are received from the distant subscriber B.

The solution of the invention is for the line echo suppressor 3 to suppress the line echoes 4.1, 6.1 that take place in the first hybrid circuit 4 and in the second hybrid circuit 6, which are created when signals are transmitted from the local subscriber A to the distant subscriber B. The echo created in the first hybrid circuit 4 is called a near echo 4.1 and is characterized by a short, essentially constant delay time. The echo created in the second hybrid circuit 6 is called a far or distant echo 6.1 and has very different delay times due to very different transmission means, for example cables and/or satellite links. Several such signal conversions can be chained together on a real transmit path for example, as illustrated in FIG. 1.

Figure 2A:
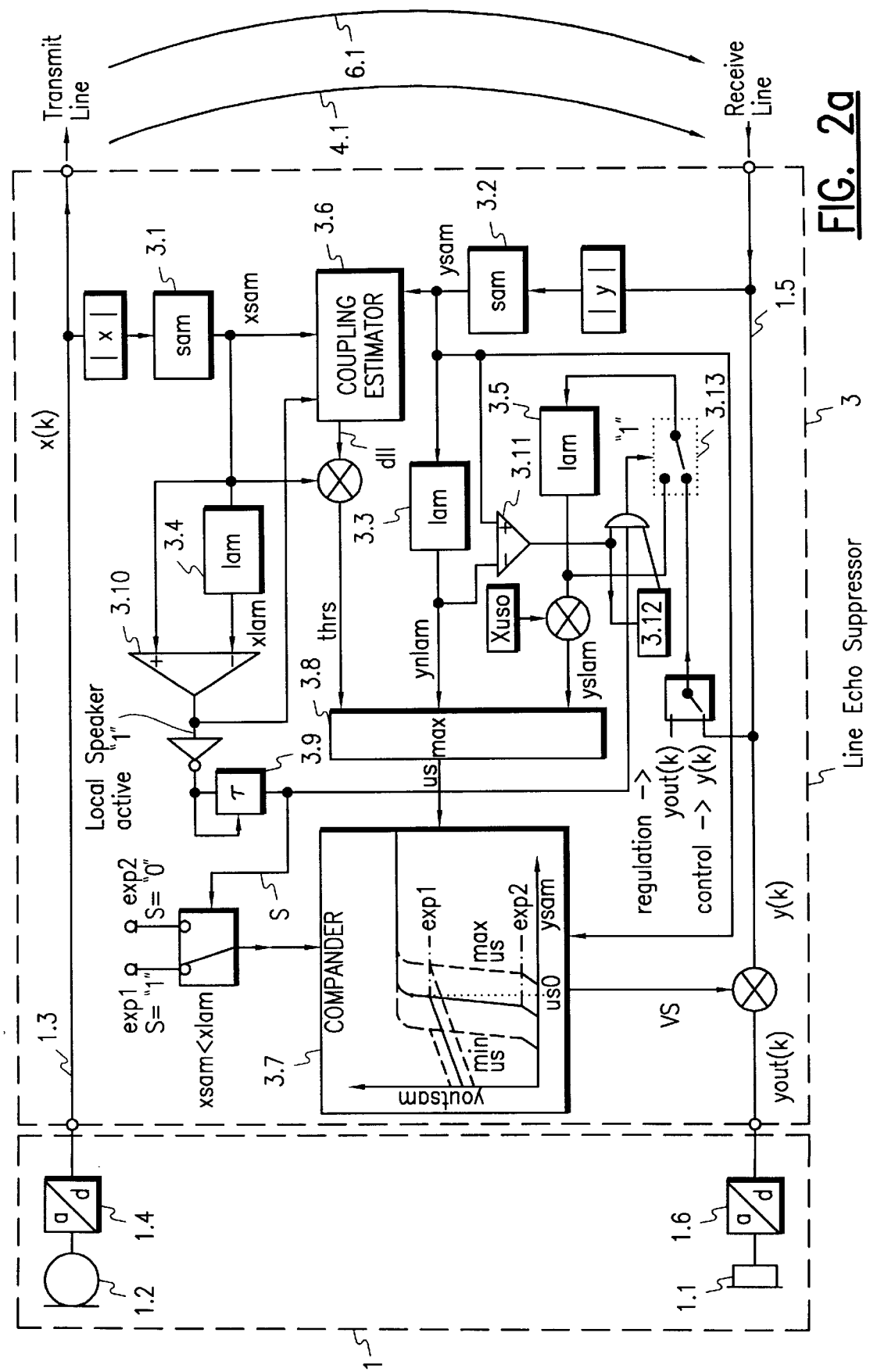
FIG. 2a a circuit diagram of a circuit arrangement according to the invention for a line echo suppressor.

According to FIG. 2a, the line echo suppressor 3 essentially comprises a compander 3.7 with a control circuit containing a coupling estimator 3.6, a first integrator 3.1, a second integrator 3.2, a third integrator 3.3, a fourth integrator 3.4 and a fifth integrator 3.5, as well as a maximum value decision circuit 3.8. The line echo suppressor 3 is connected to a local terminal 1, i.e. to its microphone 1.2 via an analog/digital converter 1.4 located on the transmit path 1.3, and to its reproduction part via a digital/analog converter 1.6 and an audio capsule or loudspeaker 1.1 on the receive path 1.5.

The transmit path 1.3 is electrically coupled to the receive path 1.5 by the unadapted hybrid circuits 4, 6 in FIG. 1, through the near echo 4.1 and the distant echo 6.1 which direct the signals received during speech transmission to a digital/analog converter 1.6 with the loudspeaker 1.1 connected on the load side.

Figure 3A:
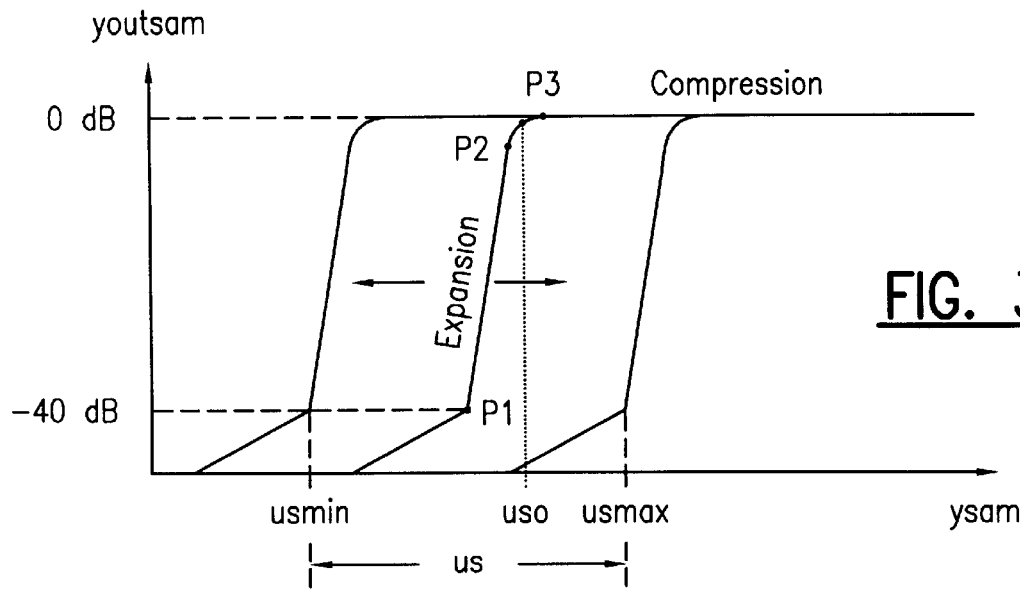
FIGS. 3a, 3b, 3c different transmission characteristics of a compander.
Figure 3B:
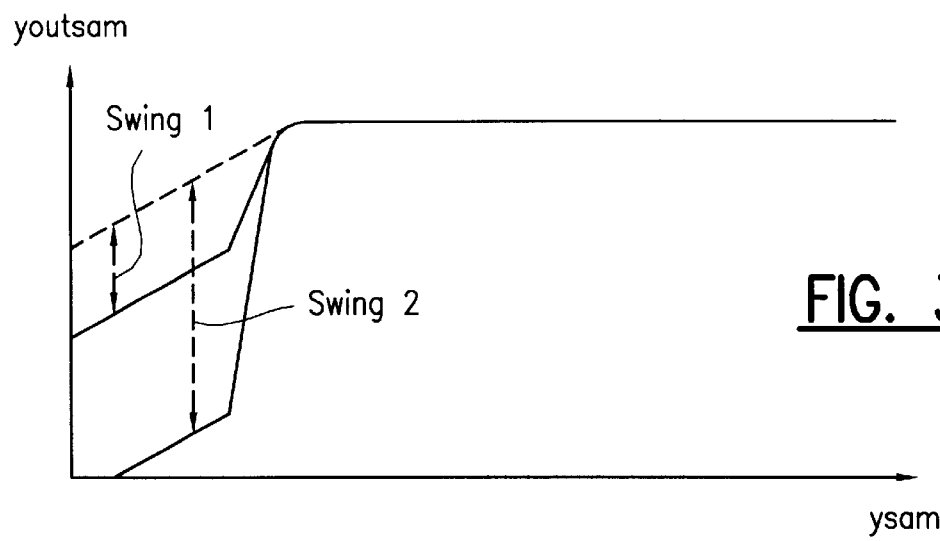
Figure 3C:
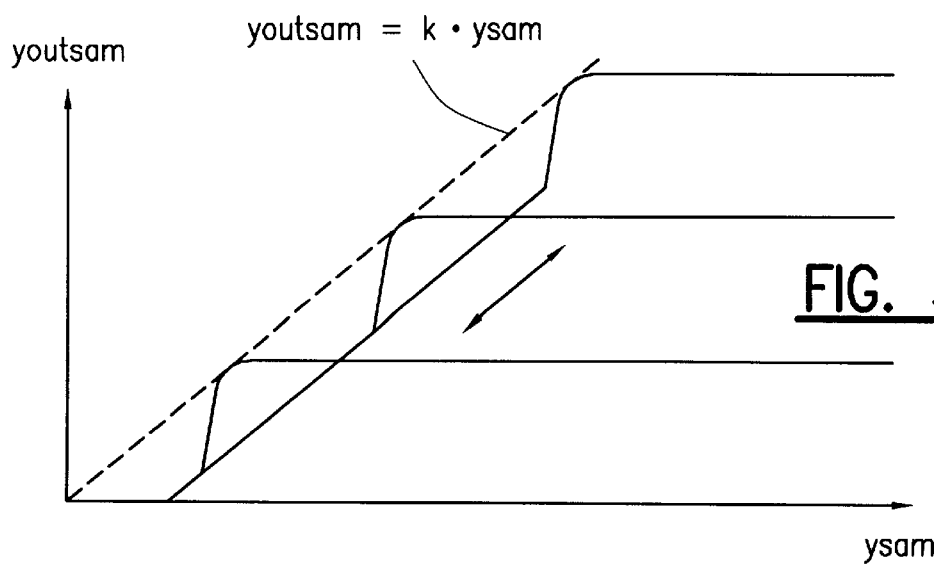

The following describes the method of the invention used to suppress line echoes, whereby the respectively required transfer characteristic of the compander, briefly called compander characteristic, is adjusted. For purposes of clarification FIGS. 3a, 3b, 3c illustrate various compander characteristics which can be used for different requirements. FIG. 3a illustrates a group of transfer characteristics, namely the output values 'youtsam' as a function of the input values ysam, where youtsam=f (ysam).

A control value 'us', which lies in the illustrated area where usmin<us<usmax, establishes different characteristic positions, for example, as shown. In this case the input value ysam represents the short-time average magnitude of the sampling sequence y(k) of the received signal (see block 3.2 of FIG. 2a), and the output value youtsam represents the short-time average magnitude of the sampling sequence yout(k) of the output signal. The quotient of output value youtsam and input value ysam provides the amplification factor VS.

The following description refers to the transfer characteristic sections in FIG. 3a. Increasing input values ysam pass up to point P1 through an area of smaller and more constant amplification, which is essentially smaller than 1. The expansion area in which the input values ysam are strongly amplified is located between points P1 and P2. A transition area between points P2 and P3 adjoins the adjacent compression and expansion areas. The operating point, i.e. the reference value for the speech signal with the current value us, is usually located in the transition area. In the compression area, the output values youtsam are constant with variable input values ysam.

Next the electrical coupling is estimated for the near echo 4.1. between the transmit path 1.3 and the receive path 1.5. To that end a short-time average magnitude xsam is formed with the first integrator 3.1 from the sampling sequence x(k) of the transmitted signal, and a short-time average magnitude ysam is formed with the second integrator 3.2. from the sampling sequence y(k) of the received signal. According to:

$$dll = \min\left|\frac{ysam}{xsam}\right|$$

only if a: the local speaker is active, and b: I≈5s, the minimum electrical coupling factor dll between transmit path 1.3 and receive path 1.5 is determined in the coupling estimator 3.6 from the quotient of the short-time average magnitudes ysam and xsam at consecutive time intervals I respectively, for example with I≈5s which is weighted with the short-time average magnitude xsam of the transmitted signal and produces a control signal 'thrs' for the compander characteristic. The estimate of the coupling factor dll only takes place when the local subscriber A is talking. To detect this condition a long-time average magnitude xlam is formed with the fourth integrator 3.4 from the short-time average magnitude xsam of the transmitted signal. If the short-time average magnitude xsam of the transmitted signal is larger than the long-time average magnitude xlam of the transmitted signal, it is an indication that the local subscriber A is talking; the short-time increase in the speech level rises above the noise level. This offers the possibility of differentiating between speech, which is generally characterized by a high dynamic, and a generally more uniform ambient noise. This can be done in a comparator as shown with a high ("1") output to indicate the local speaker is talking and to enable the coupling estimator 3.6 to determine the coupling factor dll. Once determined, the coupling factor dll may be kept until a new valid factor is determined for dll.

In the same way, a long-time average magnitude ynlam is formed from the short-time average magnitude ysam by means of the third integrator 3.3, which is a measure of the noise level in the receive path 1.5.

The larger the control signal thrs and the larger the long-time average magnitude ynlam, the larger is the control value us of the compander characteristic, which means that with an increase in the control value us, the compander characteristic shifts to the right to larger input values ysam. This shifting of the compander characteristic in the previously-cited patent DE 42 29 912 A1 is known by itself in the state of the art. However this solution does not produce the desired result for the suppression of distant echoes.

In practice the coupling values dll for the near echo and the delay time of the near echoes are relatively small; the noise level in the receive path can also be small, so that the control value us lies in small input values ysam, in order to attenuate the near echo, which is overlapped by the speech of the local subscriber A, only as much as necessary to prevent any unpleasant sidetone. It can happen with low line attenuation that the speech level of the distant subscriber B extends far into the compression area of the compander characteristic, and the level of the distant echo at a distance of 17 dB from the speech level for example, also extends into in the compression area of the compander characteristic and is therefore allowed to pass. But it is the distant echo which must be suppressed, thus a shift in the characteristic is also made to depend on the magnitude of the speech level of the distant subscriber B in the receive path 1.5.

The speech level in the receive path must therefore be reliably detected to ensure a quick adaptation of the compander characteristic to the respective current situation. To that end next the short-time level ysam is compared with the long-time level ynlam in comparator 3.11. If ysam>ynlam, it is probable that speech signals are received from the distant subscriber B when the condition for a time $t_o$>200 ms is fulfilled. If this condition was only fulfilled for a shorter time, it could have been a line fault. The test of whether a ysam>ynlam signal is present for a time $t_o$ is performed with a timer 3.12. To be able to differentiate attenuated speech levels from distant echoes for the purpose of further evaluation, no speech level is measured on the receive path 1.5 while the local subscriber A is talking and during a pause τ which follows the speech and is longer than the maximum delay time of a distant echo. To that end a corresponding control signal for a change-over switch 3.13 is formed with the switching elements 3.10 and 3.9 and an AND-gate, which either retains the long-time average magnitude in the fifth integrator 3.5, or allows a new calculation to be made of this value. Thus a speech level measurement of the distant subscriber B only takes place if:

1. ysam>ynlam,
2. condition 1 is fulfilled for a time $t_o$>200 ms, and
3. at least the time τ has passed since the event when the local subscriber A fell silent.

While these conditions are maintained a long-time average magnitude yslam, which is weighted with a factor Xuso, is formed from the sampling sequence y(k) of the received signal using the fifth integrator 3.5.

The maximum value decision circuit 3.8 determines whether the coupling at the near end of the line, the noise level or the speech level of the receive path is dominant for determining the position of the compander characteristic. The position depends on the magnitude of the output signal us from the maximum value decision circuit 3.8. The compander characteristic can be shifted along a range which is defined by the magnitudes of the output signal us. The position of the voltage value us is adjusted by the weighting factor Xuso in a way so that the speech level of the distant subscriber B lies in the transition area between expansion and compression, thus at the operating point uso between points P2 and P3 which is drawn in FIG. 3a. If there is no speech level on the receive path 1.5, the magnitude of the previously determined long-time average magnitude yslam is kept until a speech level from the distant subscriber B has again to be evaluated.

It is also possible to form the long-time average magnitude yslam of the received signal from the sampling sequence yout(k), meaning the sampling sequence y(k) of the received signal which is weighted with an amplification factor VS determined by the compander 3.7. This possibility of adjusting or regulating the voltage value us causes a slight delay in the shift of the compander characteristic so that sudden speech level increases, for example due to throat clearing or coughing, barely affect the shift in the characteristic. Whether the adjustment ("regulation" in FIG. 2a) or the control is given preference depends on the subjective auditory sensation.

It is useful to undertake the estimate of the speech on the receive path only after the communication link has been established, so that an adaptation of the compander 3.7 for dial tones or ringing tones is prevented.

To improve the naturalness of the speech exchange, the swing of the linear receiving part of the compander characteristic, i.e. the steepness of the expander, is made controllable in accordance with FIG. 3b. FIG. 3b depicts two compander characteristics with a swing 1 and a swing 2. The swing is defined as the distance between the linearly rising receiving part of the compander characteristic and a parallel, which is also a tangent in the transition area from the expansion to the compression. On the one hand this swing in a compander characteristic must be adjusted to be large enough so that no disturbing echo is transmitted, and on the other hand small enough so that the background noise from the distant subscriber B is not totally suppressed, so as not to create the impression of an interrupted connection. Absolute quiet during speech pauses is perceived as unnatural and prompts inquiries as to whether the connection between the subscribers is still there. The intelligibility of the speech is furthermore improved with a suitably small swing, since very soft parts of speech and the beginnings and endings of words often do not have sufficient energy to be assessed as speech and thereby fall into the linear part which is closely under the expansion, but are not totally suppressed with a small swing. Thus when the local subscriber A is silent, meaning that the short-time average magnitude xsam is smaller than the long-time average magnitude xlam of the transmitted signal, the small swing 1 is adjusted by means of a compander characteristic exp1. On the one hand the small swing 1 is used to suppress the ambient noise only as much as necessary, on the other hand the softer transition of the compander characteristic into the compression area becomes a more natural speech impression when the speech resumes. If the local subscriber A speaks, the larger swing 2 is adjusted by means of a compander characteristic exp2, because now distant echoes are anticipated and must be suppressed. If the local subscriber A is silent, the change from the large swing 2 to the small swing 1 by means of the control signal S is time-delayed by a delay circuit 3.9 for a time τ, since echoes can be anticipated after the speech ends.

This change in the swing can also be used to advantage with hands-free facilities, where the compander is located on the transmit path. If the local subscriber A speaks, a large swing 2 is adjusted to suppress the local echoes. A reset to the small swing 1 can then be performed without any delay because of the short delay time of the local echo.

FIG. 3c illustrates a group of compander characteristics in which the respective speech level lies along a straight line corresponding to the amplification V=1. This new type of compander characteristic makes it possible to receive soft speech signals which are heavily attenuated by the line from the distant subscriber B, and to receive signals which have less attenuation correspondingly louder. By comparison a transmission system with the group of compander characteristics of FIG. 3a balances the line attenuations of bad connections, and maintains most of the loudness level of the received speech, irrespective of the transmission level from the distant subscriber B and the line attenuation.

Figure 2B:
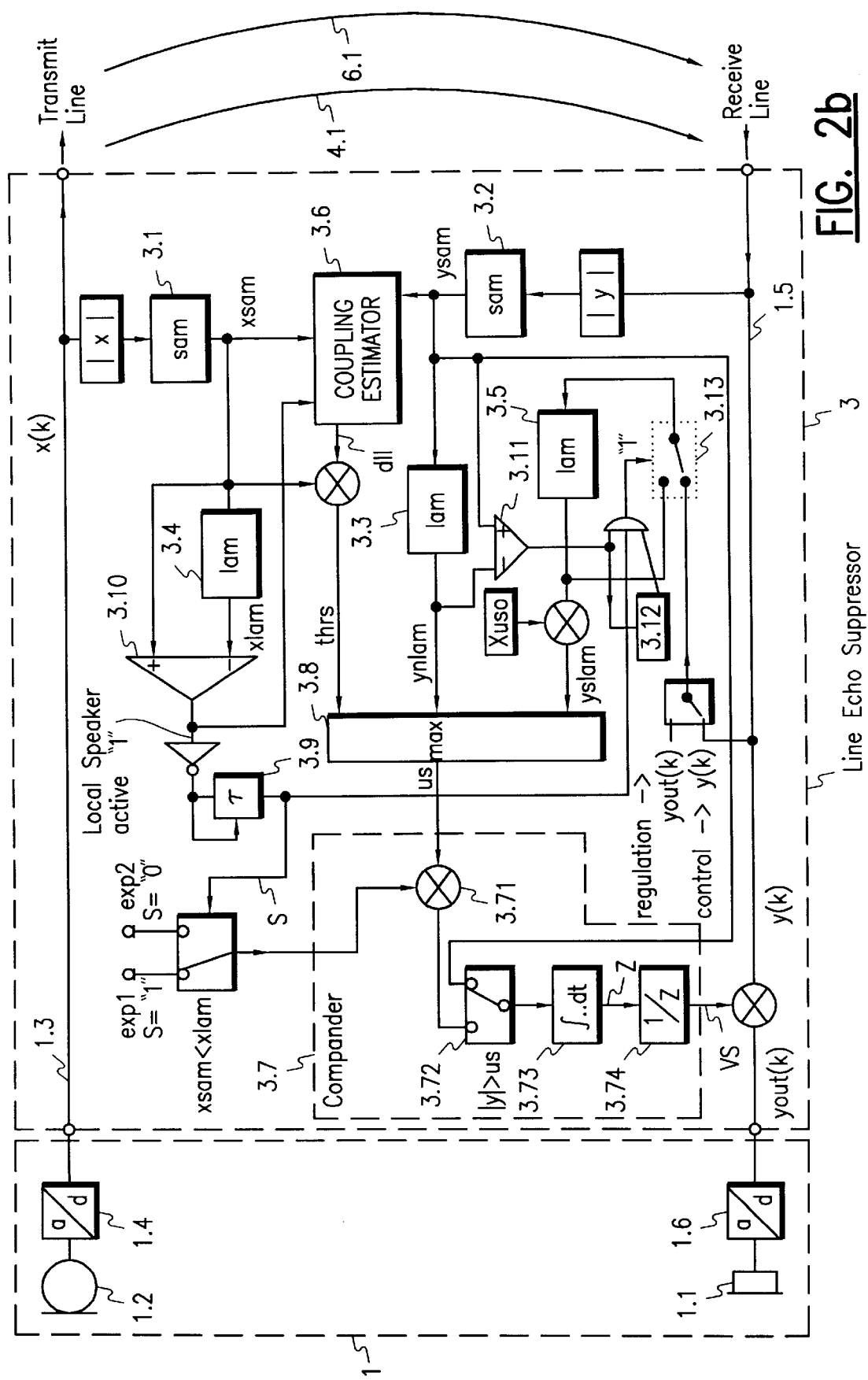
FIG. 2b a circuit diagram according to FIG. 2a with a detailed circuit arrangement for a compander.

FIG. 2b illustrates a possible way of implementing the compander 3.7. The required circuit arrangement essentially comprises a multiplier 3.71, a change-over switch 3.72, an integrator 3.73 and an inverter 3.74.

The position of the change-over switch 3.72 is determined by the current relation between the quantity of the sampling sequence of the input signal y(k) and the voltage value us. The position of the change-over switch 3.72 illustrated in FIG. 2b is taken when the quantity of the sampling sequence of the received signal y(k) is larger than the voltage value us. Next the long-time average magnitude ysam of the received signal is supplied to the integrator 3.73. If the quantity of the sampling sequence of the received signal y(k) is smaller than the voltage value us, this voltage value us is multiplied by the current swing value exp1 or exp2 of the compander characteristic and is then directed to the integrator 3.73.

This prepares for the implementation of the different characteristic sections of the compander 3.7. The integration of the output signal of change-over switch 3.73 takes place with rising pulse slopes and a small time constant, for example 6 ms, and with descending pulse slopes and a larger time constant, for example 60 ms. From the output value z of integrator 3.73, the inverter 3.74 forms the reciprocal value which represents the amplification VS of the compander as a function of the current situation, whereby the sampling sequence y(k) of the received signal is multiplied, in that way providing the sampling sequence yout(k) of the output signal of the line echo suppressor 3.

Although the configuration example refers to speech transmission, it is however possible to use the method and the circuit arrangement without any problems when a data transmission takes place for example with the aid of a modem. In this case the suppression of echoes leads to increased transmission safety and to a reduced error rate.

The circuit arrangement can be used in different areas of the transmission link. It can be inserted into a communications terminal in conjunction with a hands-free facility, so that both local echoes and line echoes are suppressed. This can involve transmission links with a mixture of digital technology four-wire lines and analog technology two-wire lines, with or without local hands-free facilities, and with or without signal processing systems such a codecs and satellite links.

It is also possible to respectively assign the circuit arrangement to the original source of the line echoes, the hybrid circuit.

A further possibility of central usage is available for example in the base station of a radio exchange system operating according to the GSM or DECT standard. For example several identical circuit arrangements can be used in that case, which are assigned to the public network as necessary for a communications link. Because of the lower cost of the circuit arrangement, it is possible for example to install eight circuit arrangements with only one digital signal processor.

Finally the circuit arrangement can be located centrally, for example in a parent exchange, where it can be switched to a transmission link as needed.

In an advantageous configuration of the invention to suppress near echoes, the line echo suppressor 3 can be combined with a short adaptive filter 3a according to FIG. 4. The effect of the adaptive filter includes suppressing the near echoes on the line well enough to achieve a total system gain, because the tolerances for adjusting the compander characteristic of the line echo suppressor 3 can then be somewhat wider.

In that case the adaptive filter can have a relatively short length of less than 100 memory elements for example, because it only needs to suppress the very near echoes of the line. The short adaptive filter is adjusted in the known manner according to the Normalized Least Mean Square Algorithm, where the control criteria for the compander can also be advantageously applied to the adaptive filter to control the step width α of the cited algorithm.

It is furthermore possible to also use the compander control criteria to control a variable attenuation element for unloading the echo.

The circuit arrangement of the invention in combination with an adaptive filter when needed, can be used to interconnect a hands-free facility comprising a hands-free compander and an adaptive filter if needed, so that a significant improvement in the communication properties of an echo-affected transmission link can then be achieved in both directions of the transmission.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of improving a transmission property of a multiple echo-affected transmission link in a hybrid circuit path telecommunications network with a compander which is inserted in a receive path of the transmission link to suppress line echoes comprising near and distant echoes and which is inserted in a transmit of the transmission link to suppress a local echo in a hands-free facility, by controlling a position of a transfer characteristic of the compander in the case of the local echo in accordance with an acoustic coupling between a loudspeaker and a microphone for use at a local subscriber location including the magnitude of noise nearby the microphone and the loudspeaker, by further controlling the position of the transfer characteristic of the compander in order to suppress the line echoes in accordance with an electrical coupling between the transmit path and the receive path, as well as a magnitude of a noise voltage on the receive path, and the speech level of a distant subscriber (B) on the receive path, and optionally by controlling a shape of a transfer characteristic of the compander in accordance with a comparison between a speech level of a local subscriber (A) and the magnitude of noise at the local subscriber (A) location and transmitted on the transmit path.

2. A method as claimed in claim 1, characterized in
   that a short-time average value (xsam) and a long-time average value (xlam) are formed from the sampling sequence (x(k)) on the transmit path, and that a short-time average value (ysam) and a long-time average value (ynlam) are formed from the sampling sequence (y(k)) on the receive path,
   that the electrical coupling between the transmit path and the receive path is determined by forming the quotient of the short-time average value (ysam) of the sampling sequence (y(k)) on the receive path and the short-time average value (xsam) of the sampling sequence (x(k)) on the transmit path,
   that the magnitude of the noise voltage on the receive path is determined from the long-time average value (ynlam) of the sampling sequence (y(k)) on the receive path,
   that the speech level (yslam) of the distant subscriber (B) on the receive path is determined by measuring a short-time average value of the sampling sequence (y(k)) on the receive path when said value is greater than the long-time average value (ynlam) of the sampling sequence (y(k)) on the receive path for a defined period of time, and
   that a maximum value which forms an input-voltage value (us) for controlling the transfer characteristic of the compander is determined from the electrical coupling weighted with the short-time average value (xsam) of the sampling sequence (x(k)) on the transmit path, the magnitude of the noise voltage, and the speech level of the distant subscriber (B), the transfer characteristic being shifted toward higher input-voltage values of the compander as the input-voltage value (us) increases.

3. A method as claimed in claim 1, characterized in that the shape of the transfer characteristic of the compander is determined by setting a small swing (swing1) when the short-time average value (xsam) is less than the long-time average value (xlam) of the sampling sequence (x(k)) on the transmit path, while setting a large swing (swing2) when the short-time average value (xsam) is greater than the long-time average value (xlam).

4. A method as claimed in claim 3, characterized in that a change in the transfer characteristic of the compander from a small swing (Hub1) to a large swing (Hub2) is made with a time delay introduced by a delay circuit after the short-time average value (xsam) becomes less than the long-time average value (xlam).

5. A circuit arrangement for carrying out the method of claim 1, characterized in that the compander has a control circuit associated therewith whose output is also the output of a maximum decision circuit having a first input connected to a coupling estimator, a second input connected to a third integrator, and a third input connected to a fifth integrator, that the coupling estimator is connected to the transmit path via a first integrator and to the receive path via a second integrator that the third integrator is connected to both the coupling estimator and the second integrator, and that the fifth integrator is connected to the receive path.

6. A circuit arrangement as claimed in claim 5, characterized by being used in conjunction with a modem for transmitting data.

7. A circuit arrangement as claimed in claim 5, characterized by being used in conjunction with a hands-free facility in a communications terminal, associated with a hybrid, or provided at a base station of a radio telecommunications system or at a switching center, as required.

8. A circuit arrangement as claimed in claim 5, characterized by being used in combination with an adaptive filter.

9. A method for improving transmission properties of a multiple echo-affected signal on a transmission link in a hybrid circuit path, comprising the steps of:

sensing a transmit path and a receive path of a transmission link for providing an electrical coupling factor signal having a magnitude indicative of an estimate of electrical coupling of a near line echo between the transmit path and the receive path;

providing, in response to said sensing of the receive path, a noise signal having a magnitude indicative of a noise level on said receive path;

providing, in response to said sensing of the receive path, a speech signal having a magnitude indicative of a speech level of a distant subscriber;

providing, in response to said electrical coupling factor signal, said noise signal,and said speech signal, a compander characteristic position control signal for controlling a position of a characteristic transfer function of a compander having a characteristic shape;

providing, in response to said compander characteristic position control signal and to said sensing of the receive path, an amplification factor signal; and providing, in response to said amplification factor signal and to said echo-affected signal on the receive path of the transmission link, an output signal for reception by a local terminal of a local subscriber.

10. The method of claim 9, further comprising the steps of:

providing, in response to said sensing of the transmit path, a local subscriber speech activity signal having a magnitude indicative of whether the local subscriber is speaking or not; and providing, in response to the local subscriber speech activity signal, a swing control signal for controlling the shape of the characteristic transfer function of the compander when said local subscriber is speaking.

* * * * *

UNITED STATES PATENT AND TRADEMARK OFFICE
CERTIFICATE OF CORRECTION

PATENT NO : 5,909,489
DATED : June 1, 1999
INVENTOR(S): Hans Jürgen Matt, Michael Walker It is certified that error appears in the above-identified patent and that said Letters Patent is hereby corrected as shown below:

At column 10, line 2 (claim 1, line 6), after "transmit" insert --path--.

Signed and Sealed this

Sixteenth Day of November, 1999

Attest:

Attesting Officer

Q. TODD DICKINSON

Acting Commissioner of Patents and Trademarks